Patented Oct. 17, 1944

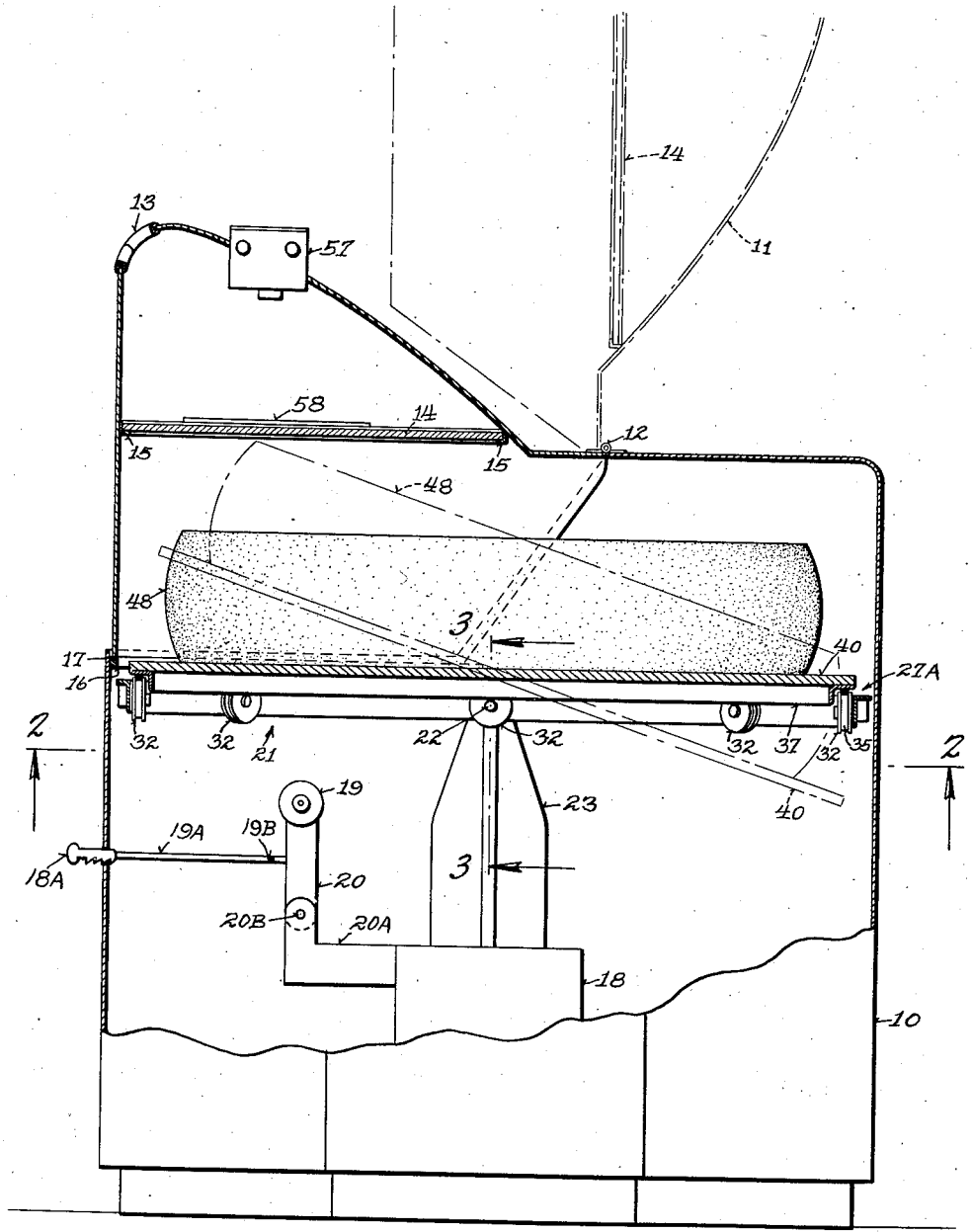

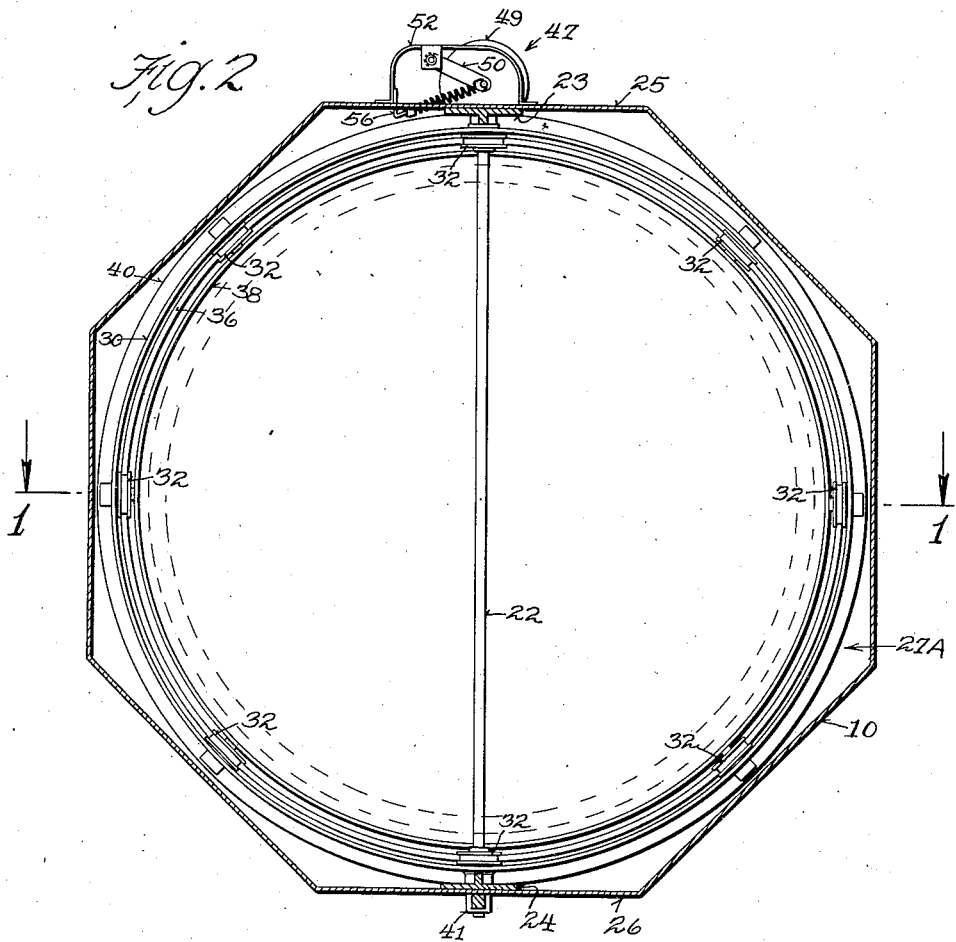
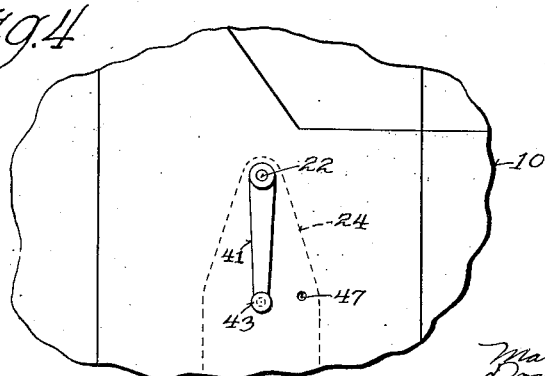

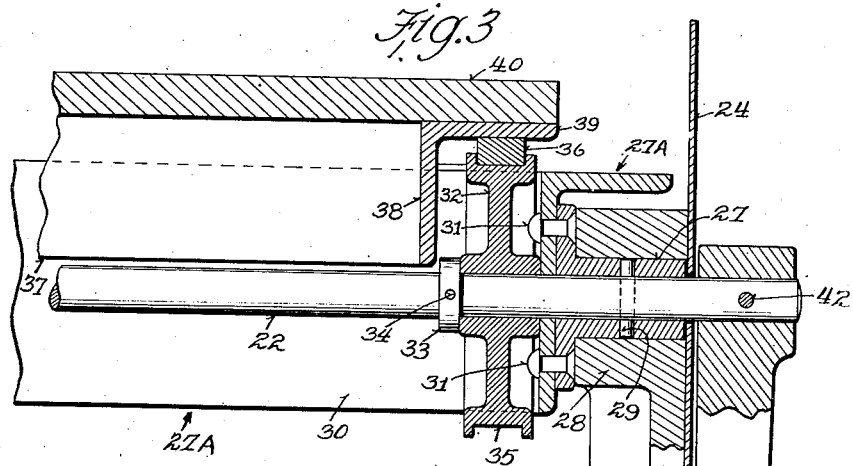
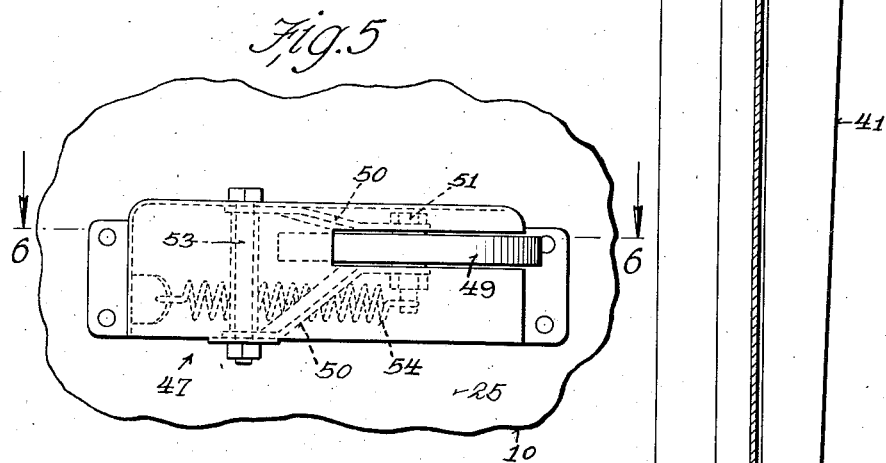
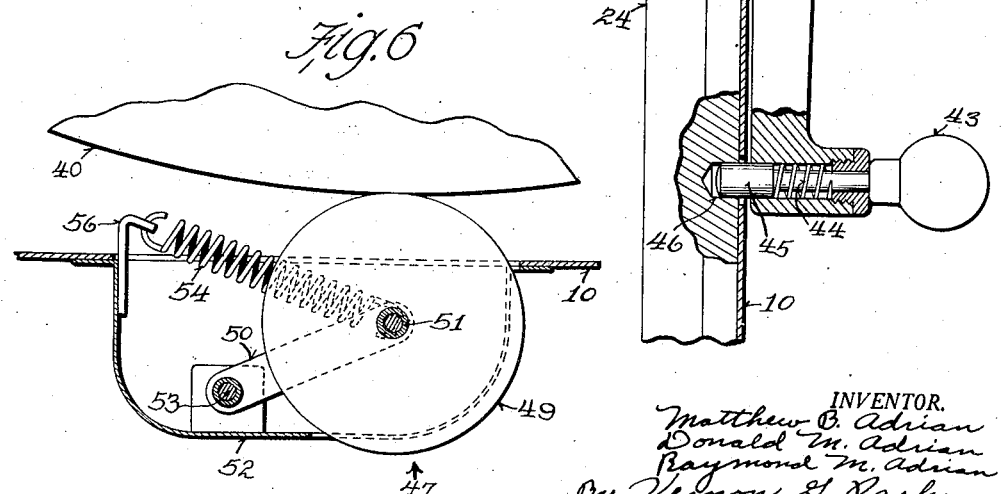

2,360,326

UNITED STATES PATENT OFFICE 2,360,326

X-RAY INSPECTION EQUIPMENT AND METHOD

Matthew B. Adrian, Donald M. Adrian, and Raymond M. Adrian, Milwaukee, Wis.

Application November 21, 1941, Serial No. 419,880

12 Claims. (Cl. 250—52)

This invention relates to improvements in X-ray inspection equipment and methods.

More particularly this invention relates to improvements in X-ray inspection equipment adapted for use for the periodic inspection of cheese during the curing period thereof.

Emmentaler or, as more commonly referred to, Swiss cheese is made by the coagulation of milk from any milk producing animal such as the cow by means of rennet, cooking and pressing the curd formed by the coagulation process, and ripening the curd with moulds or bacteria and treating the cheese in a salt brine for several months or several years as the case may be until the characteristic flavors and keeping qualities of the cheese has been developed. Emmentaler cheese when made in the United States is known as Domestic Swiss and is characterized by holes or eyes about the size of a one cent piece, these eyes occurring throughout the cheese and being about one to three inches apart. This type of cheese is formed like a massive solid wheel, approximately six inches thick and sometimes four feet in diameter, and weighing from six to two hundred and twenty pounds each.

The curing of the cheese involves careful control by the cheese maker who heretofore must periodically have the cheese plugged so that he may determine whether or not the cheese is curing as desired. The wheel of cheese is plugged at predetermined sections thereof by removing a cone shaped sample of cheese. This sample is then inspected for the formation of holes or eyes, and for other characteristics which aid in the determination of the grade and further curing of the cheese. If the sample shows the presence of the necessary size and number of holes or eyes the plug is reinserted and the cheese is graded accordingly and further curing of the cheese is made if necessary.

As soon as a wheel of cheese has been plugged mould begins to form about the plug and the cheese in the immediate vicinity of this plug must be considered a loss to the cheese manufacturer. It is also noted that more than one plug must be taken in a single wheel of cheese in order to properly determine the aging of the cheese throughout the mass. Accordingly each additional plug taken increases the loss of salable cheese for the cheese manufacturer.

Further the plugging method of determining the condition of the cheese is not entirely satisfactory since the plug is taken from a single area of the cheese wheel and the cheese between the plugs must be assumed to be aging properly from the plugs that are taken at intervals throughout the mass of cheese. The more plugs that are taken the greater the loss of cheese to the manufacturer and the fewer the plugs made the less chance there is of properly grading the cheese.

Accordingly it is an object of this invention to provide means for determining the condition of cheese without the necessity of cutting the cheese as by plugging.

Another object is to provide X-ray means for the inspection of cheese whereby the condition of eye formation of the cheese may be properly determined from time to time throughout the entire mass of cheese to be inspected.

A further object is to provide an X-ray device comprising a source of X-ray, a fluorescent viewing screen and a supporting means disposed between the source of X-ray and such screen adapted to be rotatably movable relative to the source and the screen whereby all parts of a comparatively large object may be brought into inspection position with a minimum of effort to the operator.

A still further object is to provide for an X-ray device a supporting means adapted to pivot about a horizontal axis and to rotate in a horizontal plane thereby permitting continuous X-ray inspection of an object carried by the supporting means during movement of the means from one plane of inspection to another.

Still another object is to provide an X-ray device adapted for the inspection of foodstuffs for the presence of foreign matter.

Further an object is to provide an X-ray device comprising a movably mounted X-ray tube, a movably mounted support means, a fluorescent screen disposed above the movably mounted support means, and a means adapted for the photographic reproduction of the image produced upon the fluorescent screen.

In the drawings:

Fig. 1 is a view in side elevation, partly in section, showing a wheel of cheese carried on the movable platform of the improved X-ray device.

Fig. 2 is a view taken on the line 2—2 of Fig. 1.

Fig. 3 is an enlarged view taken on the line 3—3 of Fig. 1.

Fig. 4 is a fragmentary side view of the device showing the means adapted for rotating the movable platform.

Fig. 5 is an enlarged fragmentary view showing the means adapted for rotating the movable platform.

Fig. 6 is a view taken on the line 6—6 of Fig. 5.

Like parts are indicated by the same reference numerals throughout the several views.

The X-ray device shown throughout the drawings comprises an octagonal casing 10 provided with a hook 11 hinged at 12 and having one or more eye pieces 13 (one being shown).

The hood 11 carries a fluorescent screen 14 containing sufficient litharge to protect the operator from X-ray exposure. The screen is supported by the hood at 15. The lower end of the hood is held in closed position by means of the support 16 secured to the casing 10 in any suitable manner as by welding, not shown. A gasket 17 is provided and acts as a sealing means and cushion for the lower edge of the hood 11.

Mounted within the casing 10 is a suitable transformer 18 adapted to be connected to any suitable source of electrical energy not shown.

A source of X-ray indicated at 19 in the form of an X-ray tube is connected to an arm 20 which in turn is pivotally connected at 20B to an arm 20A directly connected to the transformer 18. The tube 19 is movable about the pivot 20B by means of the lever 19A pivoted at 19B to the arm 20. The lever 19A extends through the casing 10 and is provided with a latch handle 18A adapted to hold the tube 19 in any one of a number of operating positions.

Disposed between the fluorescent screen 14 and the X-ray tube 19 is a movable support means or platform indicated generally at 21.

The support means 21 comprises an axle 22 extending in a horizontal plane diametrically across the casing 10 and pivotally supported by means of bearings 23 and 24 secured in any suitable manner as by welding, not shown, to the sides 25 and 26 respectively of the casing 10.

A roller support 27A is made of any suitable material as for example angle-iron and is circular in shape as clearly shown in Fig. 2. The roller support 27A is mounted on the axle 22 in fixed position therewith by means of the bearing 27 rotatably carried in the upper bearing head 28 (one being shown) of the bearings 23 and 24. The bearing 27 is locked to the axle 22 by means of the pin 29. The vertical flange 30 of the circular support 27A is secured to the bearings 27 by means of rivets 31.

Roller members 32 are carried by the vertical flange 30 of the circular support 27A at spaced intervals clearly shown on Fig. 2. Two of the roller members 32 are carried by the axle 22 immediately adjacent the opposite ends thereof and are secured in place by means of collars 33 secured to the axle by means of the pin 34 all as clearly shown in Fig. 3. Each roller 32 is provided with a flanged wheel surface 35.

A circular steel track 36 is rotatably supported on each of the eight rollers 32. Supported on the track 36 is a platform support 37 which comprises an angle-iron circular in shape and having a vertical side member 38 and a horizontal top member 39.

A circular platform 40 is supported on the top member 39 of the support 27 in any convenient manner not shown. The platform 40 is made of any suitable material transparent to X-ray as for example birchwood.

The axle 22 extends through the bearing head 28 and beyond the side 24 of the casing 10 and is provided with an operating handle 41 fixed to the axle 22 by means of the pin 42. The lower end of the handle 41 is provided with a plunger-like handle 43 urged to locked position by means of the spring 44. The locking end 45 of the plunger 43 is receivable in the aperture 46 provided in the bearing 24. A second aperture 47 is provided rearwardly from the aperture 46 and is adapted to receive the locking end of the plunger handle 43 whereby the movable supporting means may be held in a tipped position as shown by the broken lines in Fig. 1.

An actuating means 47 is provided as a means for rotatably moving the platform 40 and the wheel of cheese 48 supported thereon. The actuating means comprises a hand wheel 49 pivotally supported by means of the brace members 50 and the pivot axis 51. The brace members 50 are pivotally secured to the housing 52 on the pivot axis 53. The housing 52 extends outwardly from the side 25 of the casing 10 adjacent the upper end of the bearing 23. The hand wheel 49 is biased about the pivot 53 by means of the spring 54 which is secured at one end to the pivot 51 and at the other end to the hook member 56. It is to be noted that the hand wheel 49 is biased into direct contact with the peripherial edge of the platform 40 thereby permitting rotation of the platform exteriorly of the casing 10. It is further to be noted that the peripherial edge of the platform 40 adjacent the upper end of the bearing 23 provides a fixed surface against which the hand wheel 49 is biased into contact. As the supporting means 21 is moved about the axle 22 the hand wheel 49 does not disengage from the edge of the platform 40 since it is this portion of the platform that does not move out of the horizontal plane in which the platform 40 is disposed when in untipped position.

When it is desired to inspect a wheel of cheese as for example the wheel of Swiss cheese diagrammatically represented at 48 to determine the internal condition thereof (that is the size and relative distribution of the eyes) the wheel of cheese is positioned upon the platform 40 as clearly shown in Fig. 1. It is to be noted that the platform 40 is held in a horizontal position by means of the handle 41 and the plunger 43 received in the aperture 46. Before the cheese is placed upon the movable platform 40 the hood 11 is moved to the upright position fragmentarily shown in broken lines in Fig. 1.

When the cheese 48 has been placed on the platform the hood 11 is moved to closed position thereby moving the fluorescent screen 14 into operating position and causing the X-ray tube 19 to be energized by the closing of a switch not shown.

After the X-ray tube 19 is energized by the closing of the hood 11 and the X-rays emitted from the tube penetrate a given portion of the cheese disposed directly above the X-ray tube and directly beneath the fluorescent screen 14 an image is produced upon the fluorescent screen 14 which is viewed by the operator through the eye piece 13.

According to the theory of X-ray penetration the denser parts of the object being viewed shows up on the fluorescent screen as dark shadows and the less dense portion of the object being viewed shows up as lighter shadows. If the cheese has been curing properly so that a sufficient number of eyes have been formed in the cheese this proper formation will be viewable on the fluorescent screen 14. Further any foreign matter in the cheese or any other object being inspected may be recognized at this time.

After the operator has viewed this section of cheese the rotatable support means 21 is moved either in a clockwise or counterclockwise direction by means of the hand wheel 49 which is moved by the operator against the side of the platform 40 thereby causing an unexamined section of cheese to be moved into view between the fluorescent screen 14 and the X-ray tube 19. It is to be noted that the operator may continuously examine the cheese while unexamined portions of the cheese are being moved into view under the fluorescent screen. In this manner the entire wheel of cheese is examined in an effective, efficient and easy manner. Using this means of inspection eliminates the loss of cheese from mould as is the case when the plugging process is used.

If the operator is interested in the stratification or the depth to which the eyes have formed throughout the thickness of the cheese wheel 48 or checks occurring in a horizontal plane between adjacent holes or eyes which checks are generally caused by improper curing methods he may move the platform 40 through substantially 10° by means of the handle 41 or moving the tube 19 about its pivot 20B or both. In this manner the X-rays from the tube 19 are directed against the object at an angle to cause the checks or the eyes to be viewed on the screen. Unless the object can be moved so that the X-rays may penetrate the object at a different angle the desired inspection of the object may not be accomplished. The entire support means 21 is moved by means of the handle 41 and the platform 40 is prevented from being disengaged from the rollers 32 by means of the flanged wheel surface 35. The platform 40 is held in the rotated position by means of the plunger 43 received in the aperture 47 which holds the cheese in the position shown by the broken lines in Fig. 1. The cheese is inspected in this position and each successive section of the cheese wheel is brought into view under the fluorescent screen 14 by means of the operation of the hand wheel 49 against the platform 40.

After the cheese has been inspected and the condition of eye formation determined, the cheese is graded according to the analysis arrived at by means of the image shown by the X-ray device.

It is to be noted that the X-ray casing 10 is impervious to the penetration of X-rays as by providing a lead lining not shown. By providing the X-ray impervious casing 10 and automatic switch control not shown operable by means of the hood 11 the X-ray device is safe for operation by any layperson. It may further be noted that the X-ray tube 19 may be movably mounted relative to the object to be inspected and thereby provide additional flexibility in the operation of the device.

When a permanent record is desired to be made of the image produced on the fluorescent screen 14 the operator may make a picture thereof by means of the camera 57 carried in any suitable manner by the hood 11. A further method of securing a permanent record of the image is accomplished by placing an X-ray sensitive film 58 upon the upper side of the fluorescent screen 14 or upon the upper side of the object to be inspected, as in this example the cheese 48, directly in the path of the X-rays emanating from the tube 19 and exposing the X-ray film which is carried in a light proof covering to the X-rays. An image is thereby permanently recorded on the film.

From the foregoing description it is apparent that the objects of this invention has been accomplished by providing for an X-ray device a rotatable supporting means adapted to rotatably support an object, as for an example a wheel of cheese, to be inspected by means of X-ray and further, means have been provided for rotatably moving the supporting means in a horizontal plane and for pivoting the supporting means about a horizontal axis; further means have been provided whereby continuous inspection of the object may be made by the operator during movement of the support from one plane of inspection to another.

We claim:

1. An X-ray device comprising a casing, an X-ray tube within said casing, a viewing screen above said tube, and a rotatable support means disposed between said tube and said screen said support being carried by means of a second support movable about a horizontal axis into and out of a horizontal position between said screen and said tube, said second support being provided with means adapted to permit said first mentioned support to be rotated in a plane normal to the plane of movement of said second support about said axis.

2. An X-ray device comprising a casing, an X-ray tube within said casing, a viewing screen above said tube, and a support means within said casing and pivotally and rotatably disposed between said tube and said screen to permit continuous X-ray inspection of an object carried by said support means during movement of said means from one plane of inspection to another.

3. An X-ray device comprising a casing, an X-ray tube within said casing, a viewing screen above said tube, a rotatable support means disposed between said tube and said screen said means comprising an axle pivotally carried in a substantially horizontal plane by said casing, a circular support pivotally carried by said axle and adapted to be moved into and out of a horizontal plane between said screen and tube, a wheel of cheese adapted to be carried by said support means, and an operating means biased into contact with said circular support whereby said cheese may be continuously moved into the field of X-ray inspection between said screen and said tube.

4. An X-ray device comprising a casing, an X-ray tube within said casing, a viewing screen above said tube, a rotatable support means movable about a horizontal axis disposed between said screen and said tube said means comprising an axle pivotally carried in a substantially horizontal plane by said casing, a circular support pivotally carried by said axle and adapted to be moved into and out of a horizontal plane between said screen and tube, a wheel of cheese adapted to be carried by said support means, and an operating member carried by said casing adjacent one end of said axis, said member being movable into contact with said circular support whereby said cheese may be moved into the field of X-ray inspection between said screen and said tube for X-ray inspection thereof.

5. An X-ray device comprising a casing, an X-ray tube within said casing, a viewing screen above said tube, a support means within said casing and pivotally and rotatably disposed between said tube and said screen and supporting a wheel of cheese, said support means being adapted to permit the continuous X-ray inspection of said cheese during movement of said means from one plane of inspection to another, and an operating member movable into contact with said support means whereby said cheese is movable into viewing position between said screen and said tube.

6. An X-ray device comprising a casing, an X-ray tube within said casing, a fluorescent screen above said tube, and a movable support means adapted to be moved directly between said tube and screen, said means comprising an axle pivotally carried in a substantially horizontal plane by said casing, a circular support pivotally carried by said axle and adapted to be moved into and out of a horizontal plane between said screen and said tube, roller members carried by said circular support, and a platform rotatably carried by said roller members.

7. An X-ray device comprising a casing, an X-ray tube within said casing, a fluorescent screen above said tube, a pivotally mounted support means, disposed in a horizontal plane and a circular platform rotatably carried by said means and adapted to be moved into and out of a horizontal plane between said screen and said tube.

8. An X-ray device comprising a casing, an X-ray tube within said casing, a fluorescent screen above said tube, a movable support means adapted to be moved into inspection position, said means comprising an axle pivotally carried in a substantially horizontal plane by said casing, a circular support pivotally carried by said axle and adapted to be moved into and out of a horizontal plane between said screen and said tube and an image recording means carried by said casing adapted to provide a permanent record of the image produced upon said fluorescent screen.

9. An X-ray device comprising a casing, an X-ray tube movably mounted within said casing, a fluorescent screen above said tube, and a rotatable support means disposable between said tube and said screen said means comprising an axle pivotally carried in a substantially horizontal plane by said casing, a circular support pivotally carried by said axle and adapted to be moved into and out of a horizontal plane between said screen and tube.

10. An X-ray device comprising a casing, an X-ray tube movably mounted within said casing, a viewing screen above said tube, and a support means within said casing and pivotally and rotatably disposable between said tube and said screen to permit continuous X-ray inspection of an object carried by said support means during change of the angle of penetration of the X-rays through said object.

11. A method of determining the condition of eye-formation in cheese, comprising the placing of said cheese on a support rotatable in a horizontal plane and pivotable about a horizontal axis, directing X-rays from a source through said cheese onto a viewing screen while said cheese is in a horizontal position, viewing said screen, then moving said support and cheese to a position out of horizontal and again viewing said screen.

12. A method of determining the condition of eye-formation in cheese, comprising the placing of said cheese on a support rotatable in a horizontal plane and pivotable about a horizontal axis, directing X-rays from a source through said cheese onto a viewing screen while said cheese is in a plane out of horizontal, viewing said screen, then moving said support and cheese to a horizontal position and again viewing said screen.

MATTHEW B. ADRIAN.
DONALD M. ADRIAN.
RAYMOND M. ADRIAN.